United States Patent
Williams et al.

(10) Patent No.: US 8,733,006 B2
(45) Date of Patent: May 27, 2014

(54) FIREARM SENSOR SYSTEM

(75) Inventors: Nicholas Williams, Turin, NY (US); James R. Brooker, Constantia, NY (US)

(73) Assignee: The Otis Patent Trust, Lyons Falls, NY (US)

( * ) Notice: Subject to any disclaimer, the term of this patent is extended or adjusted under 35 U.S.C. 154(b) by 184 days.

(21) Appl. No.: 13/481,242

(22) Filed: May 25, 2012

(65) Prior Publication Data

US 2012/0297654 A1    Nov. 29, 2012

Related U.S. Application Data

(60) Provisional application No. 61/490,413, filed on May 26, 2011.

(51) Int. Cl.
*F41A 19/01* (2006.01)

(52) U.S. Cl.
CPC ..................................... *F41A 19/01* (2013.01)
USPC ...................................................... 42/1.01

(58) Field of Classification Search
CPC ....................................................... F41A 19/01
USPC .................................... 73/167; 42/1.01, 1.05
See application file for complete search history.

(56) References Cited

U.S. PATENT DOCUMENTS

| | | | |
|---|---|---|---|
| 4,051,814 A | 10/1977 | Jennings | |
| 7,688,219 B2 | 3/2010 | Hudson et al. | |
| 8,176,667 B2 * | 5/2012 | Kamal et al. | 42/1.01 |
| 2004/0121292 A1 | 6/2004 | Chung et al. | |
| 2005/0262992 A1 * | 12/2005 | Becker | 89/1.4 |
| 2006/0005447 A1 * | 1/2006 | Lenner et al. | 42/111 |
| 2008/0061991 A1 | 3/2008 | Urban et al. | |
| 2010/0301096 A1 | 12/2010 | Moore et al. | |

OTHER PUBLICATIONS

ISA/US International Search Report for Corresponding International Application No. PCT/US2012/039647 dated Aug. 30, 2012 (9 pgs).

* cited by examiner

*Primary Examiner* — Stephen M Johnson
(74) *Attorney, Agent, or Firm* — Harris Beach PLLC

(57) ABSTRACT

A firearm sensor system includes one or more sensor groups and a data storage device. Each of the sensor groups is configured for attachment to a firearm. One of the sensor groups includes a sensor for measuring a position of a firearm bolt relative to a start position of the bolt, and a wireless transmission component for wirelessly transmitting the sensor data. The data storage device includes a computer-readable medium having an executable application stored on the computer-readable medium. The application, when executed on a computing device, receives data from the sensor group via a wireless communication system and presents the data in a user interface displayed on a monitor. In one embodiment, the sensor includes a spring force sensor coupled to a bolt return spring on the firearm.

20 Claims, 8 Drawing Sheets

United States Patent US 8,733,006 B2

FIREARM SENSOR SYSTEM

CROSS REFERENCE TO RELATED APPLICATION

Reference is made to and this application claims priority from and the benefit of U.S. Provisional Application Ser. No. 61/490,413, filed May 26, 2011, entitled "Firearm Sensor System", which application is incorporated herein in its entirety by reference.

FIELD OF THE INVENTION

The present disclosure relates generally to a system for sensing and distributing data related to firearms such as M4s, M16s, and other rifles and carbines, for example.

BACKGROUND OF THE INVENTION

Firearm users and armorers sometimes track usage and/or maintenance issues with firearms. Firearm monitoring devices have sometimes been used for such purposes.

The discussion above is merely provided for general background information and is not intended to be used as an aid in determining the scope of the claimed subject matter.

SUMMARY OF THE INVENTION

In one aspect of the disclosure, a firearm sensor system includes a sensor group including a sensor for measuring a position of a firearm bolt relative to a start position of the bolt. The firearm sensor system further includes a communication system for communicating data from the sensor to a computing device. The firearm sensor system further includes a data storage device including a computer-readable medium having an executable application stored on the computer-readable medium. The application, when executed on a computing device, receives data from the sensor set via the communication system and presents the data from the sensor set in a user interface.

In another aspect of the disclosure, a firearm sensor system includes one or more sensor groups and a data storage device. Each of the sensor groups is configured for attachment to a firearm. One of the sensor groups includes a sensor for measuring a position of a firearm bolt relative to a start position of the bolt, and a wireless transmission component for wirelessly transmitting the sensor data. The data storage device includes a computer-readable medium having an executable application stored on the computer-readable medium. The application, when executed on a computing device, receives data from the one or more sensor groups via a wireless communication system and presents the data from the one or more sensor groups in a user interface displayed on a monitor.

In another aspect of the invention, a method for evaluating firearm usage parameters includes a step of providing a firearm that includes an attached sensor group. The sensor group includes a controller circuit and a wireless radio transmitter. The method further includes a step of providing a host computer adapted to receive wireless radio transmissions from the wireless radio transmitter. The method further includes a step of monitoring a firearm usage parameter with at least one sensor from the sensor group. The usage parameter includes a position of a firearm bolt relative to a start position of the bolt. The method further includes a step of collecting data from the at least one sensor and transmitting the sensor data wirelessly to the host computer.

This Summary is intended only to provide a brief overview of subject matter disclosed herein according to one or more illustrative embodiments, and does not serve as a guide to interpreting the claims or to define or limit the scope of the invention, which is defined only by the appended claims.

BRIEF DESCRIPTION OF THE DRAWINGS

The features described herein can be better understood with reference to the drawings described below. The drawings are not necessarily to scale, emphasis instead generally being placed upon illustrating the principles of the invention.

DETAILED DESCRIPTION OF ILLUSTRATIVE EMBODIMENTS

Figure 1:
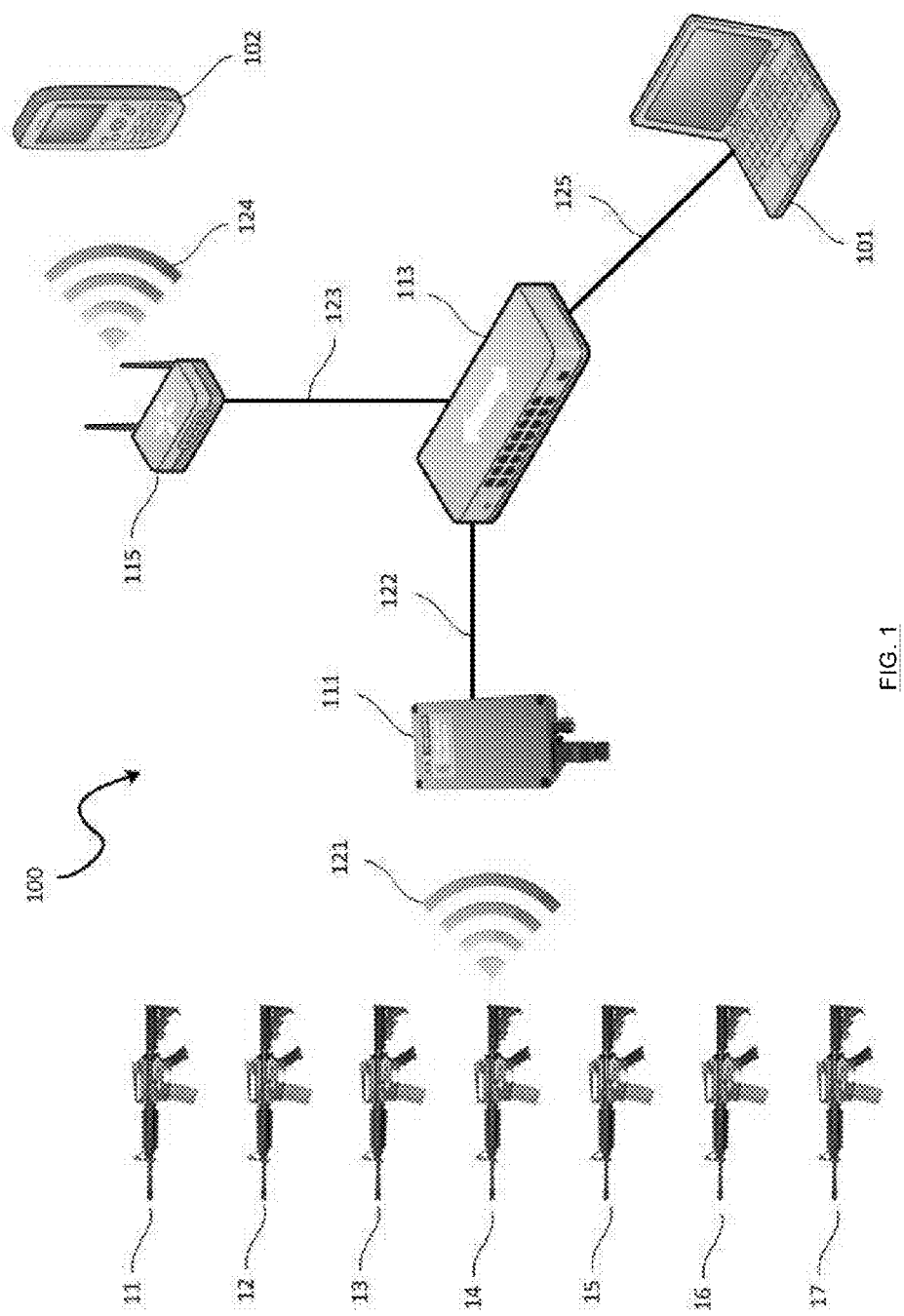
FIG. 1 depicts components of a firearm sensor system, according to an illustrative embodiment.

FIG. 1 depicts the components of firearm sensor system 100, according to an illustrative embodiment that includes a number of M4 firearms 11, 12, 13, 14, 15, 16, and 17, each of which includes a sensor group (not depicted in the view of FIG. 1) embedded in the firearm. Each of the sensor groups includes one or more sensors that detect firearm usage parameters and generate corresponding data. Each of the sensor groups also includes a wireless radio transmitter configured for relaying the data from the sensors to other wireless communication assets. As shown in FIG. 1, for example, the embedded sensor groups in firearms 11 through 17 may send radio transmissions 121 to a wireless gateway 111. In one illustrative embodiment, wireless gateway 111 may be implemented in the form of a 2.4 gigahertz (GHz), direct-sequence spread spectrum (DSSS) wireless gateway, for example, while any of a wide variety of other gateways or communication infrastructure elements using any of a wide variety of frequencies and/or protocols may be used in other embodiments.

Gateway 111 may in turn send the data over a communication network that may include hard-wired and/or wireless communication links to devices hosting a user interface. For example, in system 100 as depicted in FIG. 1, gateway 111 sends data over a cable 122 to a router 113, which sends data over a cable 125 to a laptop computer 101. Router 113 also sends data over a cable 123 to a wireless router 115, which transmits the data over RF signals 124 to a smartphone 102. Any other configuration of a communication network, using any types of network communication nodes and protocols, may also be used in other embodiments to convey the data from sensor groups embedded in or attached to firearms 11-17 to user interface devices such as laptop 101 or smartphone 102. The sensor group in each of the firearms 11-17 may also communicate data to other instruments or systems on the firearms, and those other instruments or systems may also communicate with other elements of the firearm sensor system 100 such as wireless gateway 111, in various illustrative embodiments. These other instruments, usage parameters, or systems may illustratively include a barrel temperature sensor, a remaining ammunition sensor, an optics system, or a fire control system, for example. As illustrative examples, this may include an optics system that includes automatic electronic elevation adjustment, or a fire control system that tags friendlies downrange such as with an IFF (identification friend or foe) transponder or a frequency-coded infrared marker, for example. Data from any of these instruments or systems may be transmitted through and recorded by firearm sensor system 100 in various illustrative embodiments.

Figure 2:
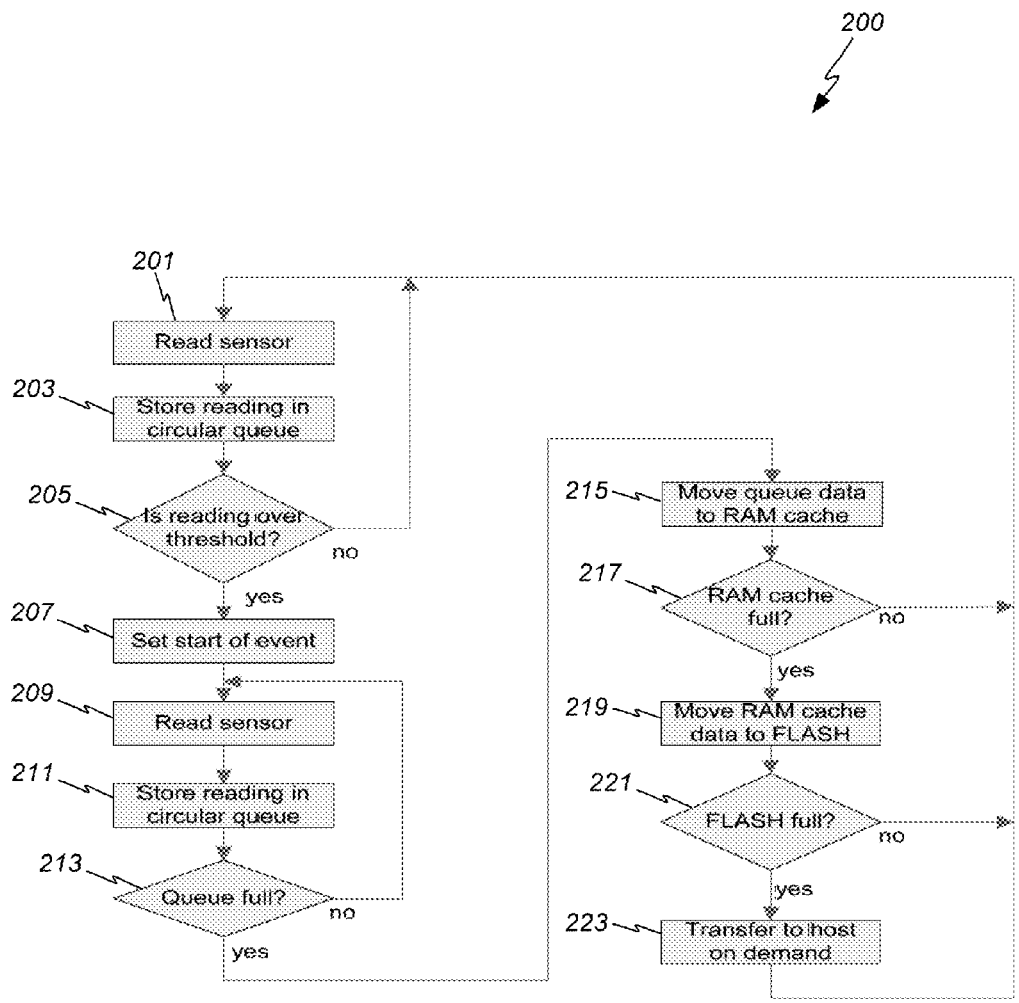
FIG. 2 depicts a flowchart for a method of a firearm sensor system, according to an illustrative embodiment.

FIG. 2 depicts a flowchart for a method 200 of a firearm sensor system, according to an illustrative example. Method 200 may be performed by a controller circuit included as part of a firearm sensor group, for example. Method 200 may begin with step 201, of reading data from one or more sensors in the sensor group, and step 203, of storing the data read from the one or more sensors in a circular queue. Node 205 is for evaluating whether the data read from the sensors is over a given threshold for the type of data. For example, a sensor group may include a spring force sensor that measures position of a bolt and a bolt carrier relative to a start position of the bolt within the firearm, such as when the bolt and bolt carrier recoil during a discharge, and the force may be evaluated for whether it exceeds a threshold limit of force, as is further explained below with reference to FIG. 3. The threshold limit of force may be selected to be indicative of a shot fired. The threshold limit may be selected so as to be greater than the forces expected from normal handling or transportation of the firearm. This provides a substantial advantage over a system based on an accelerometer alone, in which handling and transportation of the firearm would cause significant signal readings that would provide less of a base of contrast for discharges. If the threshold is not exceeded, steps 201 and 203 may be repeated, continuously as needed.

If the threshold is exceeded, then step 207 may be implemented, of setting the start of an event. This may be followed by step 209, of reading the sensor, and step 211, of storing the sensor readings in a circular queue. As in node 213, while the queue remains not full, steps 209 and 211 may be repeated, while once the queue is full, then the queue data may be moved to a RAM cache, as in step 215. As indicated in node 217, if the RAM cache remains not full, the method may return to step 201, while if the RAM cache is full, then the RAM cache data may be moved to a flash memory component, as in step 219. Similarly, as shown in node 221, while the flash remains not full, the method may then return to step 201, while once the flash is full, the data is to be transferred to the host, such as a host computer, on demand, as in step 223.

In various implementations, the controller may also transfer data to a host computer in a variety of other protocols. For example, an instruction may be received from a host computer at any time and at any point within the process of method 200 on a given sensor group, and the sensor group may respond by transmitting some or all of its available data to the host computer or another computing resource or memory resource, for example. As another example, in various implementations, the controller may also upload some or all of its data to its RAM cache, to its flash memory, or to external network-available assets on earlier schedules, either according to a regular schedule, or when the network becomes available if network availability is intermittent, for example. As one illustrative example, the sensor groups for a set of firearms may be scheduled by default to upload any available data at a pre-selected time every day, for example. An upload process may be initiated or coordinated by a firearm sensor system software application running on a computer on the network, which may coordinate an orderly upload of data from some or all of the sensor groups of interest to a database or other data store available on the network. This database or other data store may be hosted on a local server or other resource on a local network, or may be hosted on a cloud database or other remote system or asset, in various examples.

Figure 3:
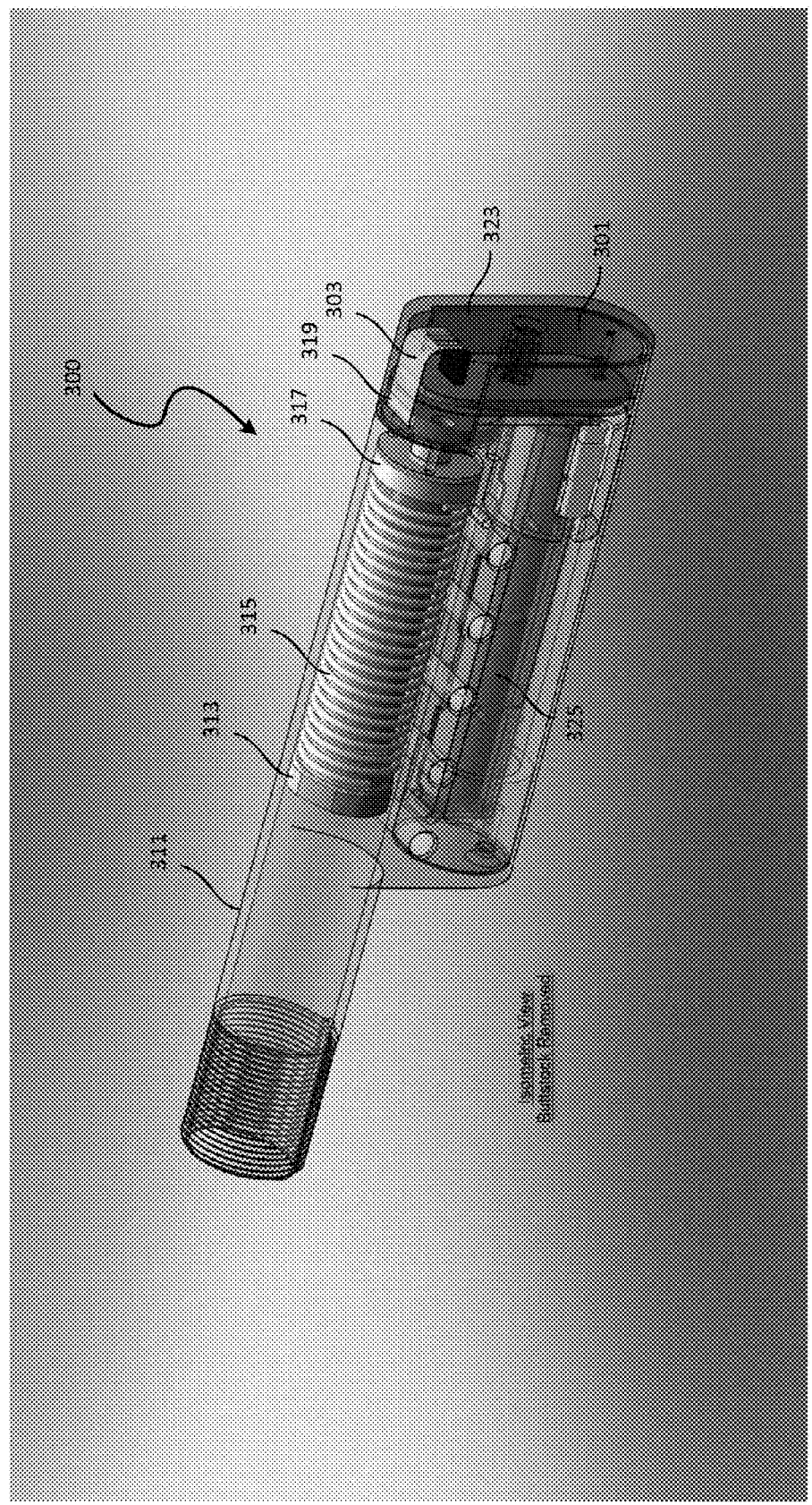
FIG. 3 depicts a perspective view of a firearm sensor group to be positioned within the stock of a firearm, according to an illustrative embodiment.

FIG. 3 depicts a perspective view of a firearm sensor group 301/303 positioned within receiver extension 300, according to an illustrative embodiment. Receiver extension 300 may be positioned with a firearm stock, such as the stock of one of the M4 firearms 11-17 depicted in FIG. 1, for example. The firearm sensor group 301/303 includes sensor control panel 301 and force sensor 303. Stock 300 forms a receiver extension, and includes buffer tube 311, buffer 313, buffer or bolt return spring 315, puck 317, pressure plate 319, stock cap 323, and batteries 325. A bolt and a bolt carrier (not depicted) may typically be disposed to recoil within buffer tube 311 during a firearm discharge. The bolt and bolt carrier may, during recoil from a discharge of the firearm, such that the bolt and the bolt carrier are pushed backward with the bolt carrier partially within buffer tube 311 and impinging on the buffer 313. This in turn may cause compression of the buffer spring 315, further conveying the force through puck 317 and pressure plate 319. The position of the bolt therefore becomes translated through this mechanism to directly determine the force exerted against pressure plate 319 and the force that is measured by force sensor 303. The process of transmitting force through these features and compressing buffer spring 315 is further depicted and described below with reference to FIGS. 6 through 8.

Force sensor 303 may directly sense force and/or displacement of pressure plate 319, and thereby implicitly measure changes in the position of the bolt, and convey data on the force and/or displacement to sensor control panel 301. A wide variety of other or additional types of sensors may also be used to detect and report force, displacement, or position of pressure plate 319 or an associated bolt, such as a Hall effect sensor, a pressure transducer, proximity switches, or a laser sensor, for example. A gas pressure transducer may also be included, and may serve as a shot count indicator, in an illustrative embodiment. In another illustrative example, tape with force sensing ink may be used, where the resistivity of the ink drops in relation to applied force, which may be measured as a rise in current, for example.

Figure 4A:
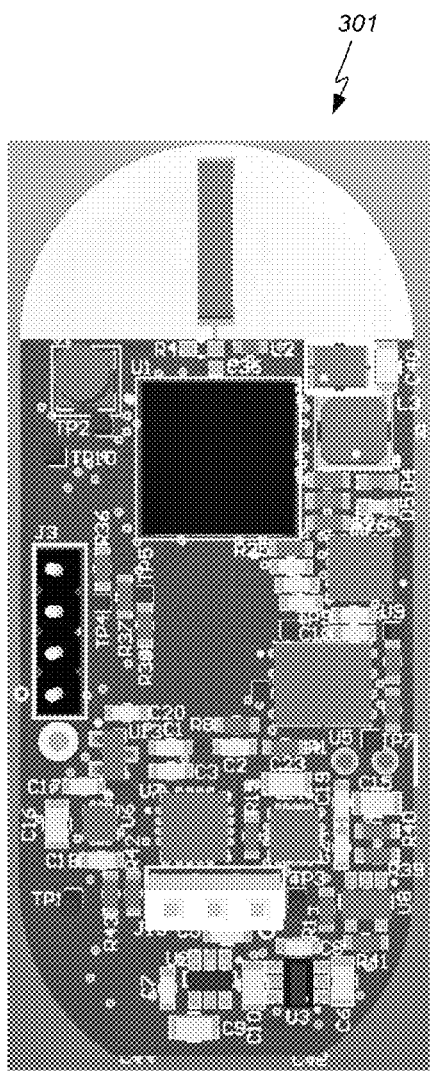
FIGS. 4A, 4B depict a top view of a sensor control panel, according to an illustrative embodiment.
Figure 4B:
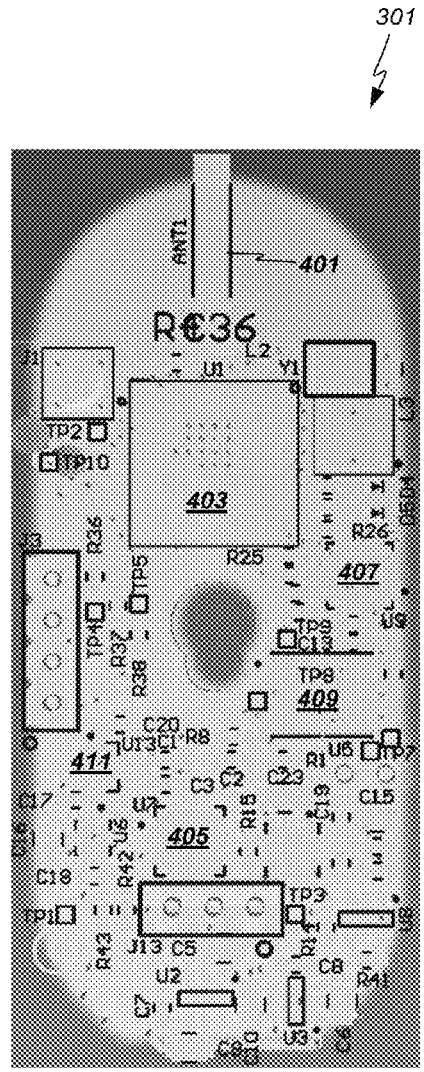
Figure 5A:
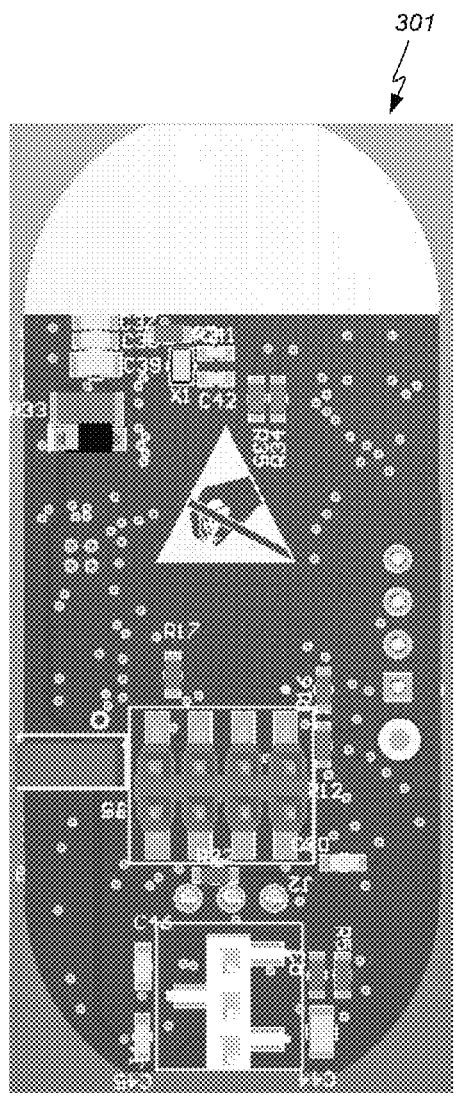
FIGS. 5A, 5B depict a bottom view of a sensor control panel, according to an illustrative embodiment.
Figure 5B:
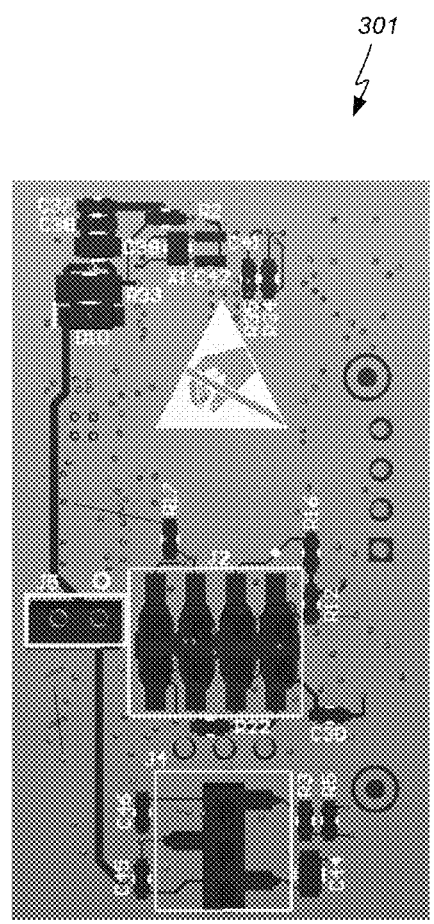

FIGS. 4A and 4B each depict a top view of a sensor control panel 301, according to an illustrative embodiment. Sensor control panel 301 may be the same as used in firearm sensor group 300 depicted in FIG. 3, in an illustrative example. Sensor control panel 301 may comprise any number and type of components including one or more sensors, one or more circuit elements that communicate with or interpret or convey data from sensors, one or more memory components, one or more control components, one or more communication components for communicating data with assets external to the sensor group, circuit elements for providing appropriate communication lines and electrical power to other circuit elements, resistors, capacitors, inductors, diodes, DC/DC converters, operational amplifiers, crystal oscillators, and other features, in various illustrative implementations. For example, illustrative sensor control panel 301 may include a chip antenna 401, platform 403 for 802.15.4 145-LGA wireless communications, three-axis gyroscope 405, accelerometer 407, flash chip 409, and temperature sensor 411, in this illustrative embodiment. Chip antenna 401 may be an RF chip antenna such as a 2.45 GHz chip antenna, as on illustrative example, though any of a wide variety of frequencies or types of antennas may be used. Other implementations may include some or all of these components and may include any of a variety of additional components, for example. FIGS. 5A and 5B each depict a bottom view of sensor control panel 301, according to an illustrative embodiment. Each of these components may make significant contributions toward the versatile functioning of sensor control panel 301, firearm sensor group 300, and of firearm sensor system 100. For example, gyroscope 405 may be used to gather training data, such as for field movement of a trainee carrying a firearm bearing firearm sensor group 300, particularly during training exercises with complex movements such as room clearing.

As noted above, the sensor groups for a set of firearms may be scheduled by default to upload any available data at a pre-selected time every day, such as midnight, for example. The firearm sensor groups may also be charged overnight or otherwise when not in use, in an illustrative embodiment. For example, a firearm bearing a firearm sensor group may be stored overnight positioned proximate to an inductive plate charger for recharging the sensor group. As another example, a kinetic charger may be used with the firearm, so that motions to which the firearm is subjected in use are applied to recharge the firearm sensor group.

Figure 6:
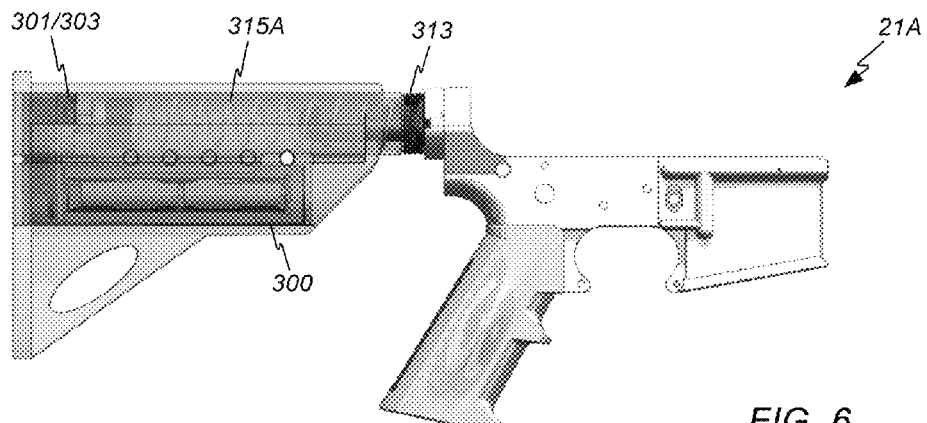
FIG. 6 depicts a side partial cutaway view of a firearm sensor group positioned within the receiver extension of a firearm and with a buffer spring in an extended position, according to an illustrative embodiment.
Figure 7:
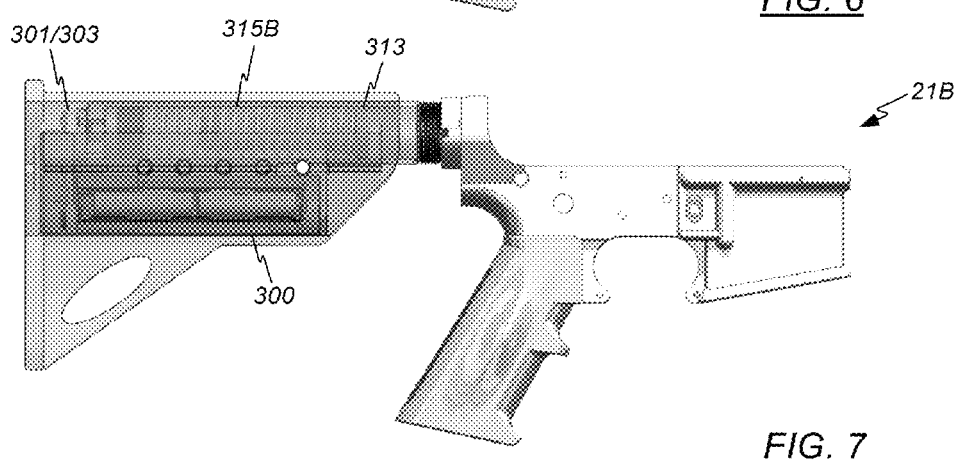
FIG. 7 depicts a side partial cutaway view of a firearm sensor group positioned within the receiver extension of a firearm and with a buffer spring in an intermediate position, according to an illustrative embodiment.
Figure 8:
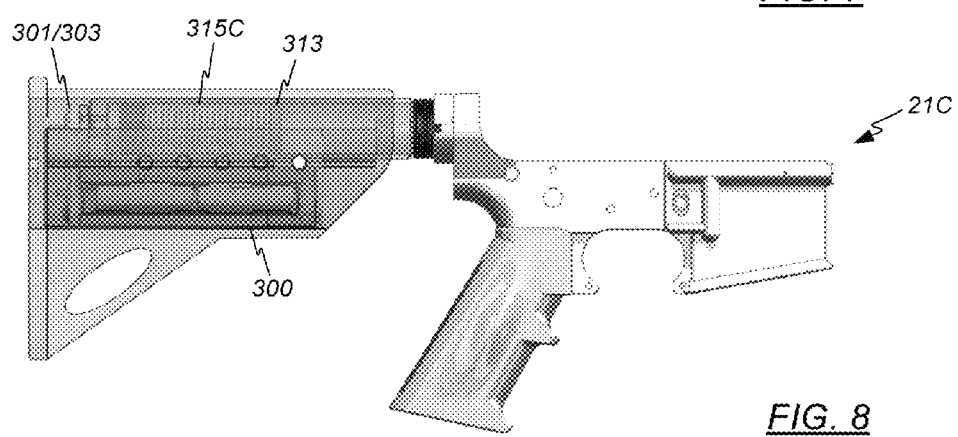
FIG. 8 depicts a side partial cutaway view of a firearm sensor group positioned within the receiver extension of a firearm and with a buffer spring in a compressed position, according to an illustrative embodiment.

FIGS. 6 through 8 each depict a side partial cutaway view of firearm sensor group 301/303 positioned within the receiver extension 300 of a firearm 21A/21B/21C. FIGS. 6 through 8 together depict a process of transmitting force from the bolt and bolt carrier of a firearm 21A/21B/21C through various features in receiver extension 300 and compressing buffer spring 315A/315B/315C. FIG. 6 depicts firearm sensor group 301/303 positioned within the receiver extension 300 of a firearm 21A, according to an illustrative embodiment. As shown in FIG. 6, buffer spring 315A is in a relaxed, extended position, with buffer 313 in a fully forward position. Buffer spring 315A may be in this extended state when the firearm 21A is not discharging, for example. FIG. 7 depicts firearm sensor group 301/303 positioned within the receiver extension of firearm 21B and with a buffer spring 315B in an intermediate position, according to an illustrative embodiment. FIG. 8 depicts firearm sensor group 301/303 positioned within the receiver extension of firearm 21C with buffer spring 315C in a compressed position. As the force is conveyed through the buffer spring 315A/315B/315C, conveying the position of the bolt, the force is measured by force sensor 303 and conveyed to sensor control panel 301.

Figure 9:
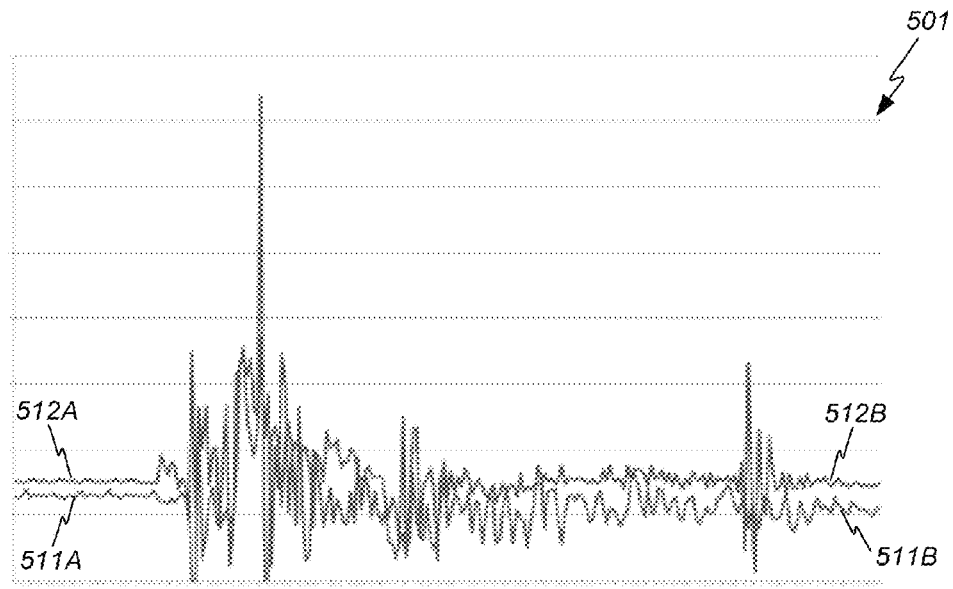
FIG. 9 depicts a graph plotting out force and bolt position over time as measured by a firearm sensor group for a proper firearm discharge, according to an illustrative embodiment.
Figure 10:
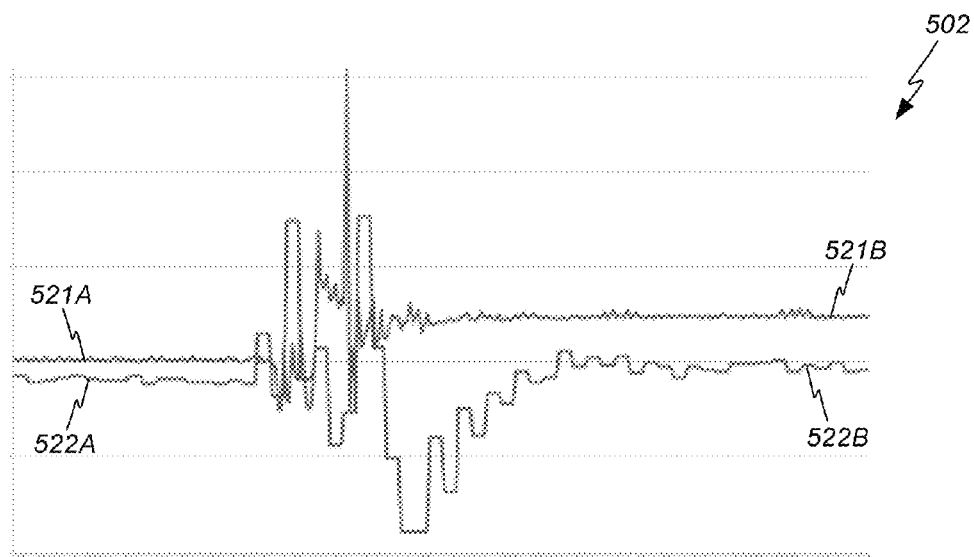
FIG. 10 depicts a graph plotting out force and bolt position over time as measured by a firearm sensor group for a faulty firearm discharge, according to an illustrative embodiment.

FIG. 9 depicts a graph plotting out force 511A/511B and acceleration 512A/512B over time as determined by a firearm sensor group 301/303 for a proper firearm discharge, according to an illustrative embodiment. The position of a bolt may be determined based on the force 511A/511B, in an illustrative example, such as by matching peaks in the force to impact events such as the bolt and bolt carrier impinging on the buffer, for example. Force 511A and acceleration 512A at the beginning of the graph are before discharge, and progress through to force 511B and acceleration 512B showing force and acceleration as indicating a proper firearm discharge. FIG. 10 depicts a graph plotting out force 521A/521B and acceleration 522A/522B over time as determined by a firearm sensor group for a faulty firearm discharge, according to an illustrative embodiment. The position of a bolt may be determined based on the force 521A/521B, in an illustrative example. Force 521A and acceleration 522A at the beginning of the graph are before discharge, and progress through to force 521B and acceleration 522B showing force and acceleration as indicating a faulty firearm discharge.

Figure 11:
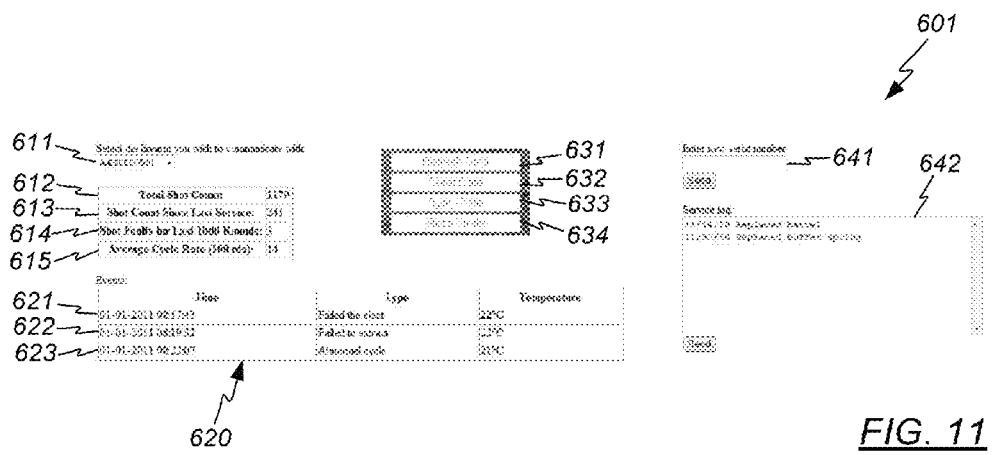
FIG. 11 depicts a graphical user interface window for a software application that forms part of a firearm sensor system, according to an illustrative embodiment.

FIG. 11 depicts a first graphical user interface (GUI) window 601 for a software application that forms part of a firearm sensor system, according to an illustrative embodiment. Drop-down field 611 allows a user to select a firearm (e.g., firearms 11-17 in FIG. 1) with which to communicate. Once selected, various data for the particular firearm can be displayed. In one embodiment, data can include total shot count 612, shot count since last service 613, shot faults 614, and average cycle rate 615. Event table 620 can display events that exceeded a threshold limit for a sensor in the sensor group, such as the spring force sensor. In the illustrated example, events 621, 622, and 623 document failed ejection, failed extraction, and an abnormal cycle, respectively. Also recorded and displayed in event table 620 is the temperature at each event, as recorded by a temperature sensor in the sensor group. First GUI window 601 may further include user input 641 for a firearm serial number, and service log 642 to document maintenance on the firearm.

Figure 12:
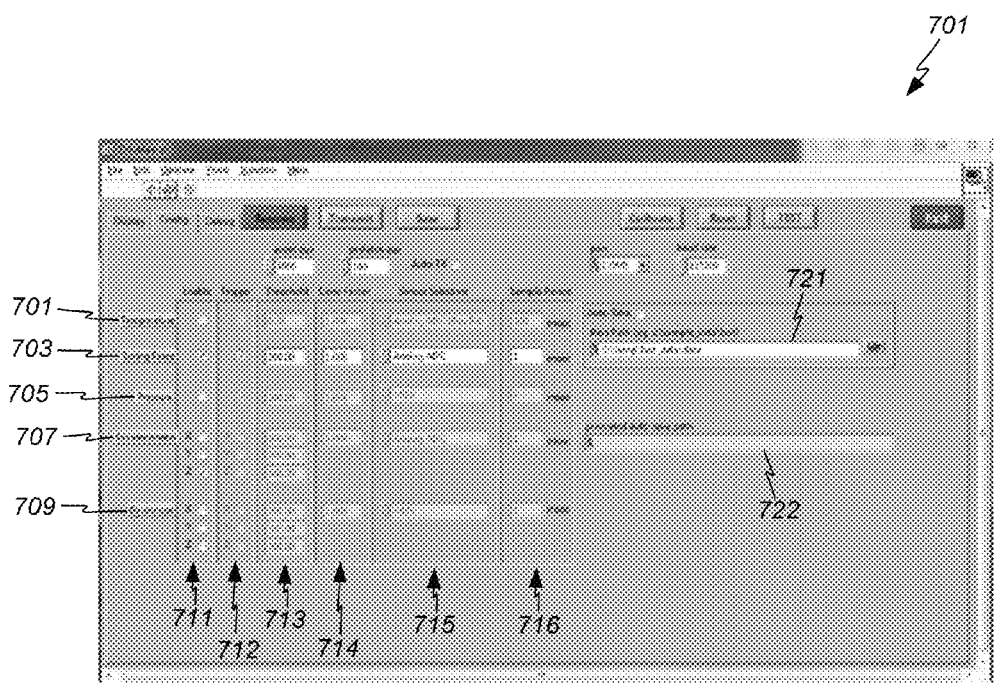
FIG. 12 depicts a graphical user interface window for a software application that forms part of a firearm sensor system, according to an illustrative embodiment.

FIG. 12 depicts a second graphical user interface (GUI) window 701 for a software application that forms part of a firearm sensor system, according to an illustrative embodiment. Second GUI window 701 includes a configuration screen to allow a user to reconfigure, select, or deselect usage parameters and limits, for example. In the illustrated embodiment, firearm usage parameters include temperature 702, spring force 703, pressure 705, three-axis accelerometer 707, and gyroscope 709. Each parameter may be adjusted by first selecting the sensor in the sensor selection menu 715, which also denotes the type of sensor output. For example, the temperature 702, spring force 703, and accelerometer 707 utilize analog to digital converters (ADC), and the pressure sensor 705 and gyroscope 709 are inactive. For each parameter, the sampling period 716 can adjusted, monitoring of the parameter can be enabled by selecting check box 711, the threshold value 713 to trigger an event can be defined, and the trigger can be enabled by check box 712. In addition, data field 722 may display a generated file auto-save path for automatically saving a firearm sensor system file associated with a particular firearm sensor system. A user may enter a base file path in data field 721 for automatic saves, and the software may automatically generate filenames by appending a timestamp and a ".csv" filename extension (indicating a comma-separated value file type) to the base file path.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements. Also, while a number of particular embodiments have been described, it will be understood that features and aspects that have been described with reference to each particular embodiment can be used with each remaining particularly described embodiment.

What is claimed is:

1. A firearm sensor system comprising:
   A sensor group comprising a sensor for measuring a position of a firearm bolt relative to a start position of the bolt;
   A communication system for communicating data from the sensor to a computing device; and
   A data storage device comprising a computer-readable medium having an executable application stored on the computer-readable medium, wherein the application, when executed on said computing device, receives data from the sensor set via the communication system and presents the data from the sensor set in a user interface.

2. A firearm sensor system comprising:
   One or more sensor groups, each configured for attachment to a firearm, wherein one of the one or more sensor groups comprises a sensor for measuring a position of a firearm bolt relative to a start position of the bolt, and a wireless transmission component for wirelessly transmitting the sensor data; and
   A data storage device comprising a computer-readable medium having an executable application stored on the computer-readable medium, wherein the application, when executed on a computing device, receives data from the one or more sensor groups via a wireless communication system and presents the data from the one or more sensor groups in a user interface displayed on a monitor.

3. The firearm sensor system of claim 2, wherein the sensor for measuring the position of the firearm bolt relative to the start position of the bolt comprises a spring force sensor coupled to a bolt return spring on the firearm.

4. The firearm sensor system of claim 3, wherein the spring force sensor senses a force exerted by the bolt return spring.

5. The firearm sensor system of claim 3, wherein the spring force sensor senses a displacement of the bolt return spring.

6. The firearm sensor system of claim 2, wherein the sensor group further comprises an accelerometer.

7. The firearm sensor system of claim 2, wherein the sensor group further comprises a temperature sensor.

8. The firearm sensor system of claim 2, wherein the application is further configured for receiving instructions through the user interface for sending back to the one or more sensor groups.

9. The firearm sensor system of claim 2, wherein the sensor group is embedded in a stock of the firearm.

10. A method for evaluating firearm usage parameters, comprising the steps of:
    Providing a firearm comprising a sensor group attached thereto, the sensor group including a controller circuit and a wireless radio transmitter;
    Providing a host computer adapted to receive wireless radio transmissions from the wireless radio transmitter;
    Monitoring a firearm usage parameter with at least one sensor from the sensor group, the usage parameter comprising a position of a firearm bolt relative to a start position of the bolt;
    Collecting data from the at least one sensor; and
    Transmitting the sensor data wirelessly to the host computer.

11. The method of claim 10, further comprising the step of processing the sensor data and, if the sensor data exceeds a threshold value, initiating an event.

12. The method of claim 11, wherein the sensor group further comprises a storage device, and the event comprises a step of reading the sensor and storing the sensor reading on the storage device.

13. The method of claim 11, wherein the event comprises transmitting the sensor data to the host computer.

14. The method of claim 10, wherein the sensor group further comprises a storage device, and the step of collecting data from the at least one sensor comprises storing the data on the storage device.

15. The method of claim 10, further comprising a step of storing the data on the host computer.

16. The method of claim 15, wherein the host computer comprises a first graphical user interface, and the method further comprises a step of displaying on the first graphical user interface the stored data.

17. The method of claim 10, wherein the step of transmitting the sensor data comprises transmitting the data at predetermined intervals.

18. The method of claim 10, further comprising a step of transmitting to the firearm sensor group from the host computer a firearm usage parameter threshold value.

19. The method of claim 18, wherein the host computer comprises a second graphical user interface, the method further comprising a step of defining the firearm usage parameter threshold value within the second graphical user interface.

20. The method of claim 10, wherein the step of transmitting the sensor data wirelessly to the host computer comprises a step of communicating the sensor data to other instruments or systems on the firearm and in response thereto, the further step of the other instruments or systems communicating the with the host computer.

* * * * *